United States Patent
Mizushita et al.

(10) Patent No.: US 12,183,486 B2
(45) Date of Patent: Dec. 31, 2024

(54) WIRING MEMBER (71) Applicant: Sumitomo Wiring Systems, Ltd., Mie (JP)

(72) Inventors: Masaki Mizushita, Mie (JP); Daisuke Ebata, Mie (JP); Yuya Fukami, Mie (JP); Kenta Arai, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 126 days.

(21) Appl. No.: 17/917,454

(22) PCT Filed: Mar. 30, 2021

(86) PCT No.: PCT/JP2021/013461
§ 371 (c)(1),
(2) Date: Oct. 6, 2022

(87) PCT Pub. No.: WO2021/210383
PCT Pub. Date: Oct. 21, 2021

(65) Prior Publication Data
US 2023/0162887 A1  May 25, 2023

(30) Foreign Application Priority Data
Apr. 13, 2020 (JP) ................ 2020-071579

(51) Int. Cl.
*H01B 7/40* (2006.01)
*H01B 7/08* (2006.01)
*H02G 3/30* (2006.01)

(52) U.S. Cl.
CPC .................... *H01B 7/40* (2013.01)

(58) Field of Classification Search
CPC ........ H02G 3/305; H01B 7/0846; H01B 7/40; B60R 16/0207; B60R 16/0215
See application file for complete search history.

(56) References Cited

U.S. PATENT DOCUMENTS

2016/0144808 A1  5/2016  Date et al.
2019/0372321 A1* 12/2019  Takamatsu ............... H02G 1/06
(Continued)

FOREIGN PATENT DOCUMENTS

JP   2004-320956   11/2004
JP   2014-143861   8/2014
(Continued)

OTHER PUBLICATIONS

Japan Official Action received in JP Application No. 2020-071579, dated Aug. 1, 2023.
(Continued)

*Primary Examiner* — Timothy J Thompson
*Assistant Examiner* — Amol H Patel
(74) *Attorney, Agent, or Firm* — GREENBLUM & BERNSTEIN, P.L.C.

(57) ABSTRACT

A wiring member includes: a wire-like transmission member; a sheet member including a main surface on which the wire-like transmission member is disposed; and at least one adhesive tape member whose one main surface is an adhesive surface. The at least one adhesive tape member surrounds the wire-like transmission member in a state where the adhesive surface faces toward the wire-like transmission member. The at least one adhesive tape member extends outward from the wire-like transmission member and is adhered to the sheet member with interposition of the adhesive surface.

10 Claims, 6 Drawing Sheets

(56) References Cited

U.S. PATENT DOCUMENTS

| | | | |
|---|---|---|---|
| 2020/0172027 A1 | 6/2020 | Mizuno et al. | |
| 2021/0210250 A1 | 7/2021 | Nishimura et al. | |
| 2021/0225556 A1 | 7/2021 | Aramaki et al. | |

FOREIGN PATENT DOCUMENTS

| | | |
|---|---|---|
| JP | 2015-32434 | 2/2015 |
| JP | 2016-210356 | 12/2016 |
| JP | 2018-105343 | 7/2018 |
| JP | 2019-3925 | 1/2019 |
| JP | 2019-207816 | 12/2019 |
| JP | 2020-22324 | 2/2020 |
| JP | 2020-44874 | 3/2020 |

OTHER PUBLICATIONS

International Search Report in International Patent Application No. PCT/JP2021/013461, dated Jun. 22, 2021, with English translation.
International Preliminary Report on Patentability in International Patent Application No. PCT/JP2021/013461, dated Oct. 13, 2022, with English translation.

\* cited by examiner

WIRING MEMBER

TECHNICAL FIELD

The present disclosure relates to a wiring member.

BACKGROUND ART

Patent Document 1 discloses a wire harness including a sheet material, an electric wire, and a holding portion at least a part of which is interposed between the electric wire and the sheet material and mediates bonding between the sheet material and the electric wire by welding.

PRIOR ART DOCUMENT

Patent Document

Patent Document 1: Japanese Patent Application Laid-Open No. 2019-3925

SUMMARY

Problem to be Solved by the Invention

When, for example, it is difficult to fuse the material around the outer periphery of the electric wire and the surface material of the sheet material, it is further required to enable the electric wire to be easily held by the sheet material.

Thus, an object of the present disclosure is to enable the wire-like transmission member to be easily held by the base member.

Means to Solve the Problem

A wiring member of the present disclosure is a wiring member including: a wire-like transmission member; a sheet member including a main surface on which the wire-like transmission member is disposed; and at least one adhesive tape member whose one main surface is an adhesive surface. The at least one adhesive tape member surrounds the wire-like transmission member in a state where the adhesive surface faces toward the wire-like transmission member. The at least one adhesive tape member extends outward from the wire-like transmission member and is adhered to the sheet member with interposition of the adhesive surface.

Effects of the Invention

According to the present disclosure, the wire-like transmission member can be easily held on the base member.

DESCRIPTION OF EMBODIMENTS

Description of Embodiments of Present Disclosure

First, embodiments of the present disclosure will be listed and described.

A wiring member of the present disclosure is as follows.

(1) A wiring member includes: a wire-like transmission member; a sheet member including a main surface on which the wire-like transmission member is disposed; and at least one adhesive tape member whose one main surface is an adhesive surface. The at least one adhesive tape member surrounds the wire-like transmission member in a state where the adhesive surface faces toward the wire-like transmission member. The at least one adhesive tape member extends outward from the wire-like transmission member and is adhered to the sheet member with interposition of the adhesive surface.

According to the present wiring member, since the at least one adhesive tape member surrounds the wire-like transmission member in a state where the adhesive surface faces toward the wire-like transmission member, the at least one adhesive tape member is firmly adhered to the wire-like transmission member. Since the adhesive tape member is adhered to the sheet member with interposition of the adhesive surface, the wire-like transmission member is firmly and easily held on the sheet member.

(2) In the wiring member according to (1), the at least one adhesive tape member may be wound with respect to the wire-like transmission member. The adhesive tape member is easily adhered to the wire-like transmission member.

(3) In the wiring member according to (2), the at least one adhesive tape member may include a side extending portion which extends toward an outside of the wire-like transmission member, and in which the adhesive surfaces are adhered to each other. Since the side extending portion is disposed along the main surface of the sheet member, the wire-like transmission member is stably disposed on the sheet member.

(4) In the wiring member according to (1), the at least one adhesive tape member may include a first adhesive tape member and a second adhesive tape member. The wire-like transmission member may be disposed between the first adhesive tape member and the second adhesive tape member. An adhesive surface of the first adhesive tape member and an adhesive surface of the second adhesive tape member may be adhered to each other on both outer sides of the wire-like transmission member. The first adhesive tape member may protrude from the second adhesive tape member and may be adhered to the sheet member. Since a portion where the adhesive surface of the first adhesive tape member and the adhesive surface of the second adhesive tape member are adhered to each other is disposed along the main surface of the sheet member on both outer sides of the wire-like transmission member, the wire-like transmission member is stably disposed on the sheet member.

(5) In the wiring member according to any one of (1) to (4), the at least one adhesive tape member may extend outward from the wire-like transmission member and may be wound around the sheet member. Since the at least one adhesive tape member extends outward from the wire-like transmission member and is wound around the sheet member, the wire-like transmission member is more reliably held on the sheet member.

(6) The wiring member according to any one of (1) to (5) may further include a fusion wire-like transmission member to be fused to the sheet member. For example, the fusion wire-like transmission member suitable for fusion can be fused to the sheet member, and the wire-like transmission member not suitable for fusion can be held on the sheet member by at least one adhesive tape member. As a result, it is possible to achieve a thin wiring member in which a fusion wire-like transmission member suitable for fusion and a wire-like transmission member not suitable for fusion are mixed.

(7) In the wiring member according to (6), the fusion wire-like transmission member may be fused to the sheet member with interposition of a plurality of partial fusion portions. The wiring member may further include an auxiliary adhesive member to be adhered to the fusion wire-like transmission member and the sheet member so as to press a part between the plurality of fusion portions in the fusion wire-like transmission member. The part between the plurality of fusion portions in the fusion wire-like transmission member are pressed against and held on the sheet member by the auxiliary adhesive member.

(8) In the wiring member according to any one of (1) to (7), the at least one adhesive tape member may be provided at a position where a portion extending from the sheet member in the wire-like transmission member is configured to be held on the sheet member. The portion extending from the sheet member in the wire-like transmission member is firmly held by the at least one adhesive tape member.

(9) In the wiring member according to (8), the at least one adhesive tape member may surround the wire-like transmission member at a position inside an end edge where the wire-like transmission member extends in the sheet member. The at least one adhesive tape member can hold the wire-like transmission member without protruding from the end edge where the wire-like transmission member extends in the sheet member.

Details of Embodiments of Present Disclosure

Specific examples of the wiring member of the present disclosure will be described below with reference to the drawings. It should be noted that the present disclosure is not limited to these examples, and is indicated by the claims, and is intended to include meanings equivalent to the claims and all modifications within the scope.

Embodiment

Figure 1:
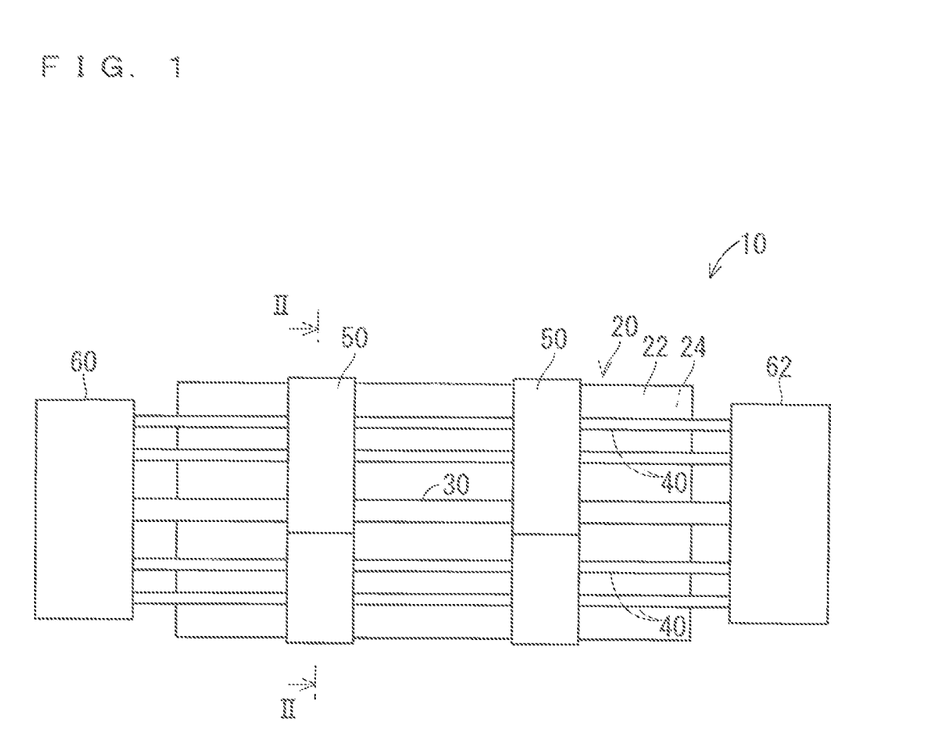
FIG. 1 is a plan view showing a wiring member according to an embodiment.
Figure 2:
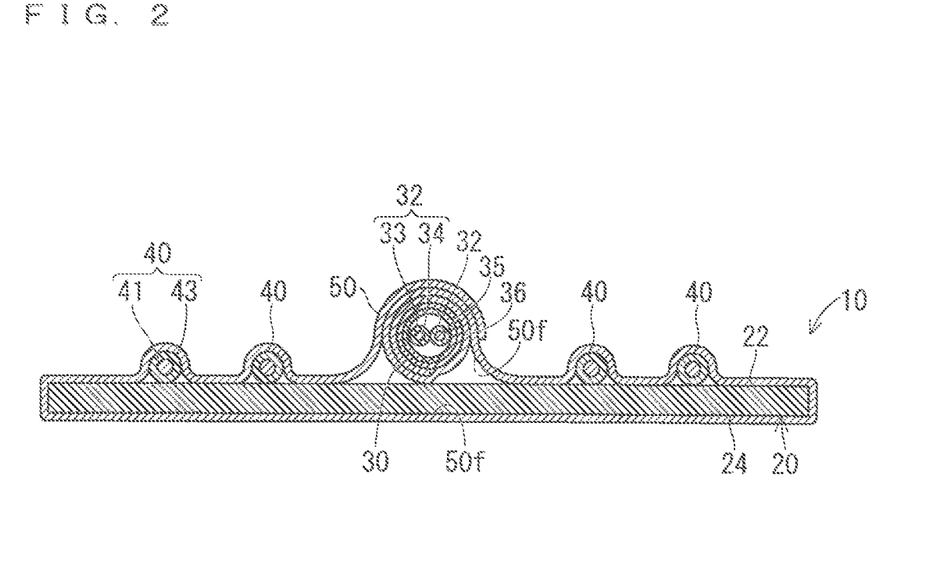
FIG. 2 is a cross-sectional view taken along line II-II in FIG. 1.

Hereinafter, a wiring member according to an embodiment will be described. FIG. 1 is a plan view showing a wiring member 10. FIG. 2 is a cross-sectional view taken along line II-II in FIG. 1. The wiring member 10 includes a sheet member 20, a wire-like transmission member 30, and at least one adhesive tape member 50.

The sheet member 20 is a sheet-shaped member. The sheet member 20 has one main surface 22 and a main surface 24 opposite to the main surface 22. In the present embodiment, the wire-like transmission member 30 is held on the main surface 22.

The sheet member 20 may be formed in a shape along the wiring path of the wire-like transmission member 30. Here, the sheet member 20 is formed in a rectangular shape elongated in one direction. The sheet member may be bent. The sheet member may have a curved portion. The sheet member may have a branched portion.

A material constituting the sheet member 20 is not particularly limited, and the sheet member 20 may be formed of a material containing a resin such as polyvinyl chloride (PVC), polyethylene terephthalate (PET), or polypropylene (PP). The sheet member 20 may be a sheet material whose inside is uniformly filled up, a nonwoven sheet, or the like. The sheet member 20 may include a material such as metal.

The sheet member 20 preferably has flexibility of being easily bent in the thickness direction. For example, the sheet member 20 may have a property of being flexible to such an extent that the sheet member can be bent along a shape of a portion where the wire-like transmission member 30 is to be disposed. In addition, for example, the sheet member 20 may have a property of being flexible to such an extent that it can be folded back and bent. The sheet member 20 may have a single layer, or may have a plurality of layers laminated. When a plurality of layers are laminated, for example, it is conceivable that the sheet member 20 has a resin layer and a resin layer laminated. More specifically, for example, it is conceivable that the sheet member 20 has a resin sheet material whose inside is uniformly filled and a nonwoven sheet laminated. In addition, for example, it is conceivable that the sheet member 20 has a resin layer and a metal layer laminated.

The wire-like transmission member 30 is assumed to be a wire-like transmission member that connects components communicably or in a power-suppliable manner in a vehicle. The wire-like transmission member 30 is disposed on the main surface 22 side so as to extend along a wiring path corresponding to a position or the like of a component to be connected.

More specifically, the wire-like transmission member 30 has only to be a wire-like member that transmits electricity, light, or the like. For example, the wire-like transmission member 30 may be a general electric wire including a core wire and a covering around the core wire, or may be a bare conductive wire, a shielded wire, a twisted wire, an enameled wire, a nichrome wire, an optical fiber, or the like.

The wire-like transmission member 30 that transmits electricity may be various signal lines or various power lines. A part, or the like, of the wire-like transmission member, the wire-like transmission member transmitting electricity, may be used as an antenna that transmits or receives a signal or power to or from a space, as a coil, or the like.

In addition, the wire-like transmission member 30 may be a single linear object or a composite of a plurality of linear objects (a twisted wire, a cable made by aggregating a plurality of linear objects and covering them with a sheath, and the like).

In the present embodiment, a description will be given assuming that the wire-like transmission member 30 is a shielded cable 30 that transmits electricity. More specifically, the shielded cable 30 includes a plurality of electric wires 32, a shield layer 35 covering the plurality of electric wires, and a sheath 36 covering the shield layer 35. The electric wire 32 includes a core wire 33 and a covering 34 covering the periphery of the core wire 33. The plurality of (here, two) electric wires 32 are twisted together. The shield layer 35 has conductivity and covers the twisted electric wires 32. The shield layer 35 is, for example, a braid in which a metal wire is knitted in a tubular shape. The sheath 36 is an insulating layer, and is formed by extruding and coating a molten resin around the shield layer 35. The shield layer 35 may be omitted. The shielded cable 30 may be used as, for example, a microphone connection cable, an antenna cable, a video signal transmission cable, a low voltage differential signaling (LVDS) signal cable, or the like.

In addition, in the present embodiment, the wiring member 10 includes a fusion wire-like transmission member 40. Similarly to the wire-like transmission member 30, the fusion wire-like transmission member 40 is a wire-like member that transmits electricity, light, or the like. Here, a description will be given assuming a case where the fusion wire-like transmission member 40 is an electric wire 40 that transmits electricity. More specifically, the electric wire 40 includes a core wire 41 and a covering 43 covering the periphery of the core wire 41. In the present embodiment, the wiring member 10 includes a plurality of (here, four) electric wires 40. It should be noted that the fusion wire-like transmission member (electric wire) 40 may be omitted.

The electric wire 40 is fused to the main surface 22 of the sheet member 20. Here, the fusion means that, for example, the resin contained in at least one of the wire-like member (electric wire) 40 and/or the main surface 22 of the sheet member 20 is melted, whereby the wire-like member (electric wire) 40 and the main surface 22 of the sheet member 20 are stuck and fixed to each other. In performing such fusion, for example, the resin may be melted by heat or may be melted by a solvent. That is, the fusion-fixed portion by fusion may be in a state of being fusion-fixed by heat or in a state of being fusion-fixed by a solvent.

The fusion by heat may be performed by ultrasonic fusion, heating-pressurizing fusion, hot air fusion, high frequency fusion, or the like. For example, the fusion portion by ultrasonic fusion may be referred to as an ultrasonic fusion portion.

At the fusion place, only the surface of the wire-like member (electric wire) 40 may melt, only the main surface 22 of the base member (sheet member) 20 may melt, or both resins of the two may melt.

In order for the electric wire 40 to be fused to the sheet member 20, the surface material of the electric wire 40 is preferably a material that can be fused to the main surface 22 of the sheet member 20. For example, the material of the main surface 22 of the sheet member 20 and the surface (covering 43) material of the electric wire 40 may include the same resin material. For example, when the main surface 22 of the sheet member 20 is formed of a material containing PVC, the surface material of the electric wire 40 may be a material containing PVC.

The shielded cable 30 is disposed along a fixed path on the main surface 22. Here, the shielded cable 30 is disposed from one end portion to the other end portion of the sheet member 20 along the extending direction of the sheet member 20. Here, the shielded cable 30 is linearly disposed along the extending direction of the sheet member 20.

The electric wire 40 extends so as to be along the shielded cable 30 on the main surface 22. Here, a plurality of electric wires 40 are dispersedly arranged on both sides of the shielded cable 30. A gap is provided between the plurality of electric wires 40. A gap is provided also between the electric wire 40 and the shielded cable 30. The electric wire and the shielded cable 30 may be in contact with each other. The electric wires 40 may be in contact with each other.

It is not essential that the electric wire 40 is disposed along the shielded cable 30. The electric wire 40 may be fused to the main surface 22 along a path different from that of the shielded cable 30.

Both end portions of the shielded cable 30 and the electric wire 40 may be connected to the connectors 60 and 62. Here, the connector 60 is provided at a position away from one end portion of the sheet member 20, and the connector 62 is provided at a position away from the other end portion of the sheet member 20. The connectors 60 and 62 may be fixed to the sheet member 20. One end portion of the shielded cable 30 (here, one end portions of the plurality of electric wires 32) and one end portion of the electric wire 40 extend from the end portion of the sheet member 20 and are connected to the same connector 60. The other end portion of the shielded cable 30 (here, the other end portions of the plurality of electric wires 32) and the other end portion of the electric wire extend from the end portion of the sheet member 20 and are connected to the same connector 62.

The at least one adhesive tape member 50 is a member for holding the shielded cable 30 on the main surface 22. In FIG. 1, at least one adhesive tape member 50 is provided at each of a plurality of places (here, two places) spaced apart from each other in the extending direction of the shielded cable 30. In the present embodiment, the at least one adhesive tape member 50 includes one adhesive tape member 50. One main surface of the adhesive tape member 50 is an adhesive surface 50f. Here, adhesion means, for example, bonding to an object by application of pressure. More specifically, adhesion means that a surface of a viscous liquid, gel, or the like is pressurized on an object to come into close contact with an uneven surface of the object, whereby the surface is bonded to the object. The adhesive surface 50f is a surface having such an adhesive property. The adhesive tape member 50 having the adhesive surface 50f can adhere to the surface of the sheet member 20 and the surface of the shielded cable 30 by a dynamic bonding force mainly by an anchoring effect or the like. Therefore, regardless of chemical adhesion compatibility between the adhesive surface 50f and the surface material of the sheet member 20 and the surface material of the shielded cable 30, the adhesive tape member 50 can adhere to both the main surface 22 of the sheet member 20 and the surface of the shielded cable 30. The adhesive tape member 50 may be an adhesive tape (what is called, PVC tape) in which an adhesive layer is formed on one main surface of a belt-shaped base material formed of PVC or the like.

The at least one adhesive tape member 50 holds the shielded cable 30 on the sheet member 20 by the following configuration. That is, at least one adhesive tape member 50 is in a state of surrounding the shielded cable 30 in a state where the adhesive surface 50f faces the shielded cable 30 side. In addition, the at least one adhesive tape member 50 extends outward from the shielded cable 30 and is adhered to the sheet member 20 with interposition of the adhesive surface 50f.

In the present embodiment, the adhesive tape member 50 is wound with respect to the shielded cable 30 with the adhesive surface 50f inner side. The adhesive tape member 50 may be wound with respect to the shielded cable 30 by one or more turns. The adhesive tape member 50 may be wound around the shielded cable 30 by 3/2 or more, or may be wound with respect to the shielded cable 30 by 2 or more turns. In the adhesive tape member 50, in a portion to be wound around the shielded cable 30 by one turn, the adhesive surface 50f is adhered to the outer peripheral surface of the shielded cable 30. In the adhesive tape member 50, a portion exceeding one turn with respect to the shielded cable 30 overlaps the facing-outward surface of the portion wound around the shielded cable 30 and is adhered to the facing-outward surface. Accordingly, a state in which the adhesive tape member 50 is wound around the shielded cable 30 is more reliably held.

One end side portion in the adhesive tape member 50 is wound around the shielded cable 30 as described above. The other end side portion in the adhesive tape member 50 extends outward from the shielded cable 30 and is adhered to the sheet member 20. The other end side portion in the adhesive tape member 50 may be wound around the sheet member 20.

In the present embodiment, the shielded cable 30 is positioned at an intermediate portion in the width direction of the sheet member 20. The other end side portion of the adhesive tape member 50 extends from the shielded cable 30 along the width direction of the sheet member 20 on the main surface 22. The adhesive tape member 50 reaches one side edge portion of the sheet member 20 and is folded back to the other main surface 24 side at the one side edge portion. The adhesive tape member 50 extends along the width direction of the sheet member 20 on the other main surface 24 and reaches the other side edge portion of the sheet member 20. The adhesive tape member 50 is folded back to the one main surface 22 side at the other side edge portion of the sheet member 20. The adhesive tape member 50 further extends on the main surface 22 along the width direction of the sheet member 20 and reaches the shielded cable 30. Therefore, the other end side portion of the adhesive tape member 50 is wound with respect to the sheet member 20 by one or more turns and reaches the shielded cable 30 again. The adhesive tape member 50 may be wound with respect to the sheet member 20 by exceeding one turn.

At the other end side portion of the adhesive tape member 50, the adhesive surface 50f faces inward. Therefore, the adhesive surface 50f is adhered to both main surfaces 22 and 24 of the sheet member 20. Therefore, the other end side portion of the adhesive tape member 50 is firmly adhered to the sheet member 20. In addition, at a place where the electric wire 40 is present in the main surface 22, the adhesive tape member 50 is adhered also to the outer periphery of the electric wire 40. Therefore, the adhesive tape member 50 can also play a role of pressing the electric wire 40 against the sheet member 20. In addition, the other end portion of the adhesive tape member 50 reaches the shielded cable 30 and is adhered to a portion wound with respect to the shielded cable 30 in the one end side portion of the adhesive tape member 50. Therefore, the shielded cable 30 is held by the adhesive tape member 50 adhered to the main surface 22 from both sides thereof, and the shielded cable 30 is firmly held on the main surface.

Since at least a part of the adhesive tape member 50 only needs to be adhered to the sheet member 20, it is not essential that the adhesive tape member 50 is wound around the sheet member 20. In addition, it is not essential that the other end side portion of the adhesive tape member 50 is wound by one turn and reaches the shielded cable 30 again. In addition, it is not essential that the adhesive tape member 50 adheres to the electric wire 40.

As described above, the configuration in which the shielded cable 30 being an example of the wire-like transmission member is held on the sheet member 20 by at least one adhesive tape member 50 may be applied to a case where it is difficult to fuse the shielded cable 30 being an example of the wire-like transmission member to the main surface 22. For example, it is the case where the surface material of the electric wire 40 (here, the material of the covering 43) being an example of the fusion wire-like transmission member 40 has the following property in the relationship between the surface material of the shielded cable 30 (here, the material of the sheath 36) and the surface material of the main surface 22. This property is a case where the peeling strength of the electric wire 40 to the main surface 22 by fusion is larger than the peeling strength of the shielded cable 30 to the main surface 22 by fusion. The peeling strength may be evaluated as follows. For example, the shielded cable 30 and the electric wire 40 are fused to the sheet member 20 under the same condition. For example, the shielded cable 30 and the electric wire 40 are ultrasonically fused to the sheet member 20 under the same pressurizing force, pressurized time, and vibration conditions. Then, the same type of peeling test (for example, a test in accordance with any one test specified in JIS K6854) is implemented on the shielded cable 30 and the electric wire 40 from the sheet member 20 and the peeling strength is evaluated. For example, a 180° peel test in which the shielded cable 30 or the electric wire 40 is folded back by 180° and pulled with respect to the sheet member 20, a T-type peel test in which the sheet member 20 and the shielded cable 30 or the electric wire 40 are pulled in mutually opposite vertical directions with respect to the fusion surface, or the like is implemented. The magnitude of the peeling strength is evaluated by performing the same type of test on the shielded cable 30 and the electric wire 40.

Such a difference in peeling strength can be brought about by a combination of the constituent material of the main surface and the surface material of the electric wire and the shielded cable 30. For example, when the main surface 22 is formed of a material containing PVC, it is conceivable that the covering 43 of the electric wire 40 is formed of a material containing PVC, and the sheath 36 of the shielded cable 30 is formed of a resin not containing PVC, for example, a material containing polyethylene terephthalate (PET), polypropylene (PP), a fluororesin, or the like.

The electric wire 40 being an example of the wire-like member and the shielded cable 30 being an example of the wire-like transmission member may have the same thickness or different thicknesses. When the electric wire 40 and the shielded cable 30 have different thicknesses, any one of them may be thicker.

The configuration in which at least one adhesive tape member holds the wire-like transmission member may be applied to a wire-like transmission member easily fused to a sheet member.

According to the wiring member 10 configured thus, the at least one adhesive tape member 50 surrounds the shielded cable 30 in a state where the adhesive surface 50f faces a side of the shielded cable 30 being an example of the wire-like transmission member. Therefore, the at least one adhesive tape member is firmly adhered to the shielded cable 30. Since the at least one adhesive tape member 50 is adhered to the sheet member 20 with interposition of the adhesive surface 50f, the shielded cable 30 is firmly and easily held on the sheet member 20.

In addition, when the adhesive tape member 50 is wound with respect to and adhered to the shielded cable 30, the adhesive tape member 50 is easily and firmly adhered to the shielded cable 30.

In addition, when the adhesive tape member 50 extends outward from the shielded cable 30 and is wound around the sheet member 20, the adhesive tape member 50 is firmly adhered to the sheet member 20. As a result, the shielded cable 30 is more reliably and firmly held on the sheet member 20. In particular, when the adhesive tape member 50 is configured to be wound with respect to the sheet member 20 by exceeding one turn and to adhere again to the adhesive tape member 50 around the shielded cable 30, the shielded cable 30 is held by the adhesive tape member 50 from both sides. Accordingly, the shielded cable 30 is more firmly held at a fixed position on the sheet member 20.

In addition, the wiring member 10 includes an electric wire 40 as an example of the fusion wire-like transmission member 40. Therefore, the electric wire 40 suitable for fusion can be fused to the sheet member 20, and the shielded cable 30 not suitable for fusion can be held on the shielded cable 30 by at least one adhesive tape member 50. Accordingly, it is possible to achieve a thin wiring member 10 by mixing the electric wire 40 suitable for fusion and the shielded cable 30 not suitable for fusion.

[Modifications]

A modification premised on the above embodiment will be described. It should be noted that components similar to those described in the embodiment are denoted by the same reference numerals, and the description thereof will be omitted.

Figure 3:
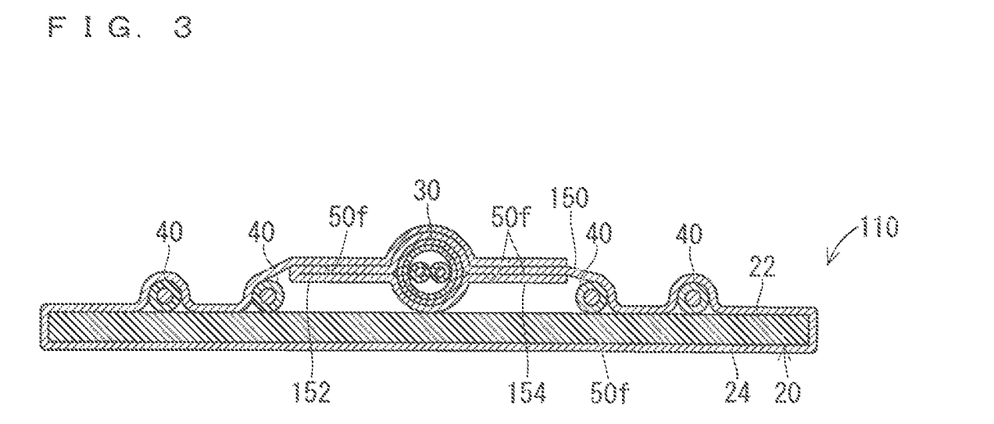
FIG. 3 is a cross-sectional view showing a wiring member according to a first modification.

FIG. 3 is a cross-sectional view showing a wiring member 110 according to a first modification. The present wiring member 110 includes at least one adhesive tape member 150 corresponding to at least one adhesive tape member 50. Here, the at least one adhesive tape member 150 includes one adhesive tape member 150.

The manner of winding the adhesive tape member 150 with respect to the shielded cable 30 is different from that of the above embodiment. That is, one end side portion of the adhesive tape member 150 is wound around the shielded cable 30. Here, the one end side portion of the adhesive tape member 150 is wound around the shielded cable 30 by one turn. An intermediate portion of a portion wound around the shielded cable 30 in the adhesive tape member 150 extends outward from a part in the circumferential direction of the shielded cable 30, thereby forming a side extending portion 152. The side extending portion 152 extends from the shielded cable 30 toward one side edge portion of the sheet member 20. In the side extending portion 152, two portions in the adhesive tape member 150 overlap each other with the adhesive surfaces 50f facing each other. Therefore, the side extending portion 152 includes a portion where the two portions of the adhesive tape member 150 overlap each other with the adhesive surfaces 50f adhered to each other, and a folded portion where the adhesive tape member 150 is folded back at the outer end portion thereof.

One end portion of the adhesive tape member 150 serves as an extending end portion 154 extending in a direction opposite to the side extending portion 152 from the shielded cable 30. The adhesive tape member 150 is wound around the shielded cable 30 by one turn while forming the side extending portion 152, and overlaps the extending end portion 154. The extending end portion 154, and a portion overlapping the extending end portion 154 in the adhesive tape member 150, are maintained in an overlapping state by adhesion between the adhesive surfaces 50f.

The other end side portion of the adhesive tape member 150 goes out from the extending end portion 154 and reaches the shielded cable 30 again through the main surface 22 of the shielded cable 30, the edge of the sheet member 20, the other main surface 24, the opposite edge of the sheet member 20, and the one main surface 22. The other end portion of the adhesive tape member 150 is adhered to the side extending portion 152. The other end portion of the adhesive tape member 150 may be adhered to a portion on the outer peripheral side of the shielded cable 30 in the adhesive tape member 150, beyond the side extending portion 152. The other end portion of the adhesive tape member 150 may be adhered onto a portion adhered to the extending end portion 154 in the adhesive tape member 150.

According to the present wiring member 110, the side extending portion 152 extends from the shielded cable 30.

Since the side extending portion 152 is disposed along the main surface of the sheet member 20, the shielded cable 30 is stably disposed on the sheet member 20. For example, when the side extending portion 152 comes into contact with the main surface 22 or the electric wire 40 on the main surface, the shielded cable 30 is less likely to roll on the sheet member 20, and the position of the shielded cable 30 is stabilized. In addition, for example, when the adhesive tape member 150 reaches the side extending portion 152 and is adhered to the side extending portion 152, the adhesive tape member 150 which winds around the sheet member 20 by one turn and the side extending portion 152 are adhered to each other with a large area. Accordingly, the shielded cable 30 is stably held from both sides of the shielded cable 30 by the adhesive tape member 150, and the position of the shielded cable 30 is stabilized.

It should be noted that in the above example, the lengths of the side extending portion 152 and the extending end portion 154 are set to the extent as to reach between the edge of the sheet member 20 and the shielded cable 30, but the lengths are not particularly limited. For example, the side extending portion and the extending end portion may have lengths that reach the edge of the sheet member.

Figure 4:
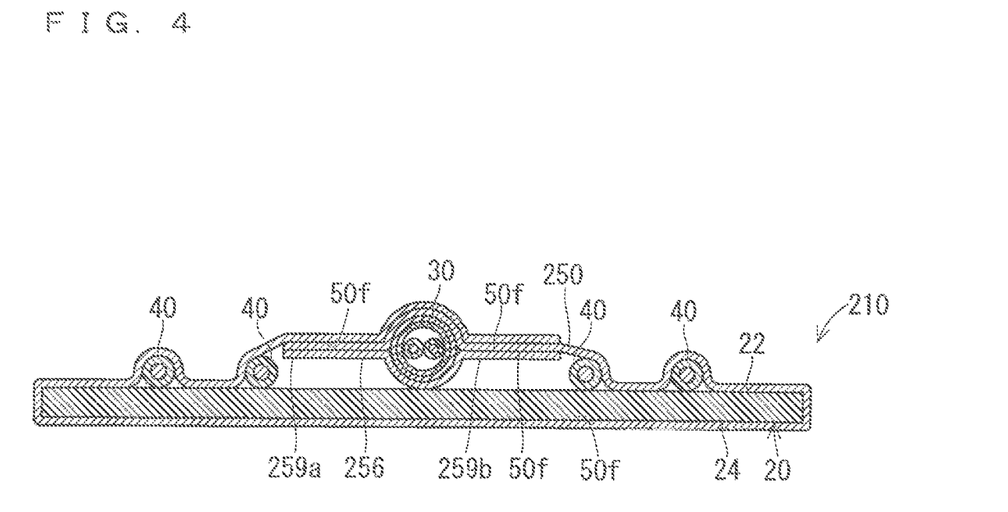
FIG. 4 is a cross-sectional view showing a wiring member according to a second modification.

FIG. 4 is a cross-sectional view showing a wiring member 210 according to a second modification. The present wiring member 210 includes at least one adhesive tape member 250, 256 corresponding to at least one adhesive tape member 50. Here, the at least one adhesive tape member 250, 256 includes a first adhesive tape member 250 and a second adhesive tape member 256.

Similarly to the adhesive tape member 50, the first adhesive tape member 250 and the second adhesive tape member 256 are belt-shaped members having an adhesive surface 50f. The first adhesive tape member 250 is longer than the second adhesive tape member 256. The first adhesive tape member 250 is set to have a length such that the first adhesive tape member 250 can be wound around the sheet member 20 by one or more turns. The second adhesive tape member 256 is set to be equal to or less than the width of the sheet member 20.

One end side portion of the first adhesive tape member 250 and the second adhesive tape member 256 are overlapped with each other along the width direction of the sheet member 20 with the adhesive surfaces 50f facing each other. The shielded cable 30 is disposed between the intermediate portion in the extending direction of the first adhesive tape member 250 and the intermediate portion in the extending direction of the second adhesive tape member 256. On the outside of both sides of the shielded cable 30, the adhesive surface 50f of the first adhesive tape member 250 and the adhesive surface 50f of the second adhesive tape member 256 are adhered to each other. In the following description, in the two overlapping portions of the first adhesive tape member 250 and the second adhesive tape member 256, a portion close to one end portion of the first adhesive tape member 250 may be referred to as an overlapping portion 259a, and the other may be referred to as an overlapping portion 259b.

Between the overlapping portions 259a and 259b, the adhesive surface 50f adheres to the outer peripheral surface of the shielded cable 30. Accordingly, the shielded cable 30 is held at a more fixed position between the first adhesive tape member 250 and the second adhesive tape member 256.

The other end side portion of the first adhesive tape member 250 protrudes from the end portion of the second adhesive tape member 256 and is adhered to the sheet member 20. Here, the other end side portion of the first adhesive tape member 250 goes out from the second adhesive tape member 256 and reaches the shielded cable 30 again through the main surface 22 of the shielded cable 30, the edge of the sheet member 20, the other main surface 24, the opposite edge of the sheet member 20, and the one main surface 22. The other end portion of the first adhesive tape member 250 is adhered to the overlapping portion 259a. The other end portion of the first adhesive tape member 250 may be adhered to a portion on the outer peripheral side of the shielded cable 30 in the one side end portion of the first adhesive tape member 250. The other end portion of the first adhesive tape member 250 may be adhered to the overlapping portion 259b beyond the shielded cable 30.

According to the present wiring member 210, since the overlapping portions 259a and 259b are disposed along the main surface of the sheet member 20, the shielded cable 30 is stably disposed on the sheet member 20. For example, when the overlapping portions 259a and 259b come into contact with the main surface 22 or the electric wire 40 on the main surface, the shielded cable 30 is less likely to roll on the sheet member 20, and the position of the shielded cable 30 is stabilized. In addition, for example, when the first adhesive tape member 250 reaches the overlapping portion 259a and is adhered to the overlapping portion 259a, the first adhesive tape member 250 which winds around the sheet member 20 by one turn and the overlapping portion 259a are adhered to each other with a large area. Accordingly, the shielded cable 30 is stably held from both sides of the shielded cable 30 by the first adhesive tape member 250 and the second adhesive tape member 256, and the position of the shielded cable 30 is stabilized.

It should be noted that in the above example, the lengths of the overlapping portions 259a and 259b are set to the extent as to reach between the edge of the sheet member 20 and the shielded cable 30, but the lengths are not particularly limited. For example, the overlapping portion may have a length that reaches the edge of the sheet member.

Figure 5:
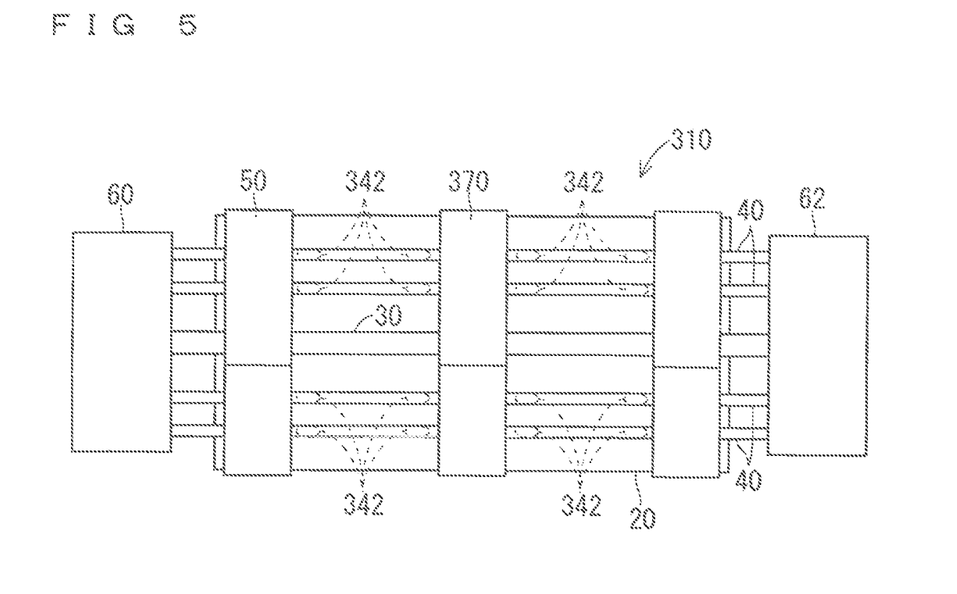
FIG. 5 is a plan view showing a wiring member according to a third modification.

FIG. 5 is a plan view showing a wiring member 310 according to a third modification. In the wiring member 310, the at least one adhesive tape member 50 is provided at both end portions of the sheet member 20. The at least one adhesive tape member 50 is provided at a position where a portion extending from the sheet member 20 in the shielded cable 30 can be held on the sheet member 20. In other words, the holding structure by the at least one adhesive tape member 50 is provided at a position closest to the extending portion among the holding structures of the shielded cable 30 with respect to the sheet member 20. That is, in the holding structure by the at least one adhesive tape member 50, a portion extending from the sheet member 20 in the shielded cable 30 is a portion that receives a force when being pulled. For example, the at least one adhesive tape member 50 may be provided at a position spaced apart with respect to the end portion of the sheet member 20 by 5 cm or less.

Accordingly, the portion extending from the sheet member 20 in the shielded cable 30 is firmly held by the at least one adhesive tape member 50.

The at least one adhesive tape member 50 preferably surrounds the shielded cable 30 at a position inside the edge of the sheet member 20. Accordingly, the at least one adhesive tape member 50 can hold the shielded cable 30 without protruding from the end edge where the shielded cable 30 extends in the sheet member 20.

In the wiring member 310, the electric wire 40 is fused to the sheet member 20 through a plurality of partial fusion portions 342. An auxiliary adhesive member 370 to be adhered to the electric wire 40 and the sheet member 20 is provided so as to press between the plurality of fusion portions 342 in the electric wire 40.

The auxiliary adhesive member 370 may be a member similar to the adhesive tape member. The auxiliary adhesive member 370 only needs to be adhered to the sheet member 20, the shielded cable 30, and the electric wire 40 in a state of surrounding the sheet member 20, the shielded cable 30, and the electric wire 40.

The auxiliary adhesive member 370 can press the part between the plurality of fusion portions 342 in the electric wire 40 toward the sheet member 20. It should be noted that as described above, when there are a plurality of fusion portions in the extending direction of the electric wire 40, a configuration in which the electric wire 40 is pressed toward the sheet member by the adhesive tape member between the plurality of fusion portions 342, such as the auxiliary adhesive member 370, can be established as a technique for suppressing floating of the electric wire between the fusion portions even in a configuration not premised on the adhesive tape member 50 and the shielded cable 30.

It is not essential that the auxiliary adhesive member 370 is in a state of surrounding the shielded cable 30. At the end portion of the sheet member 20, a force for peeling the shielded cable 30 from the sheet member 20 acts at the time or the like of handling the connectors 60 and 62. Therefore, it is preferable that a configuration for firmly holding the shielded cable 30 is applied to the end portion of the sheet member 20 as with the configuration using the adhesive tape member 50. On the other hand, at the intermediate portion in the extending direction of the sheet member 20, the shielded cable does not need to be held as firmly as at the end portion of the sheet member 20. Therefore, at the intermediate portion in the extending direction of the sheet member 20, the auxiliary adhesive member 370 may be in a state of surrounding the sheet member 20, the shielded cable 30, and the electric wire 40 without surrounding the shielded cable 30 alone. However, the auxiliary adhesive member 370 may also be in a state of surrounding the shielded cable 30 as in the above-described embodiment and each modification.

Figure 6:
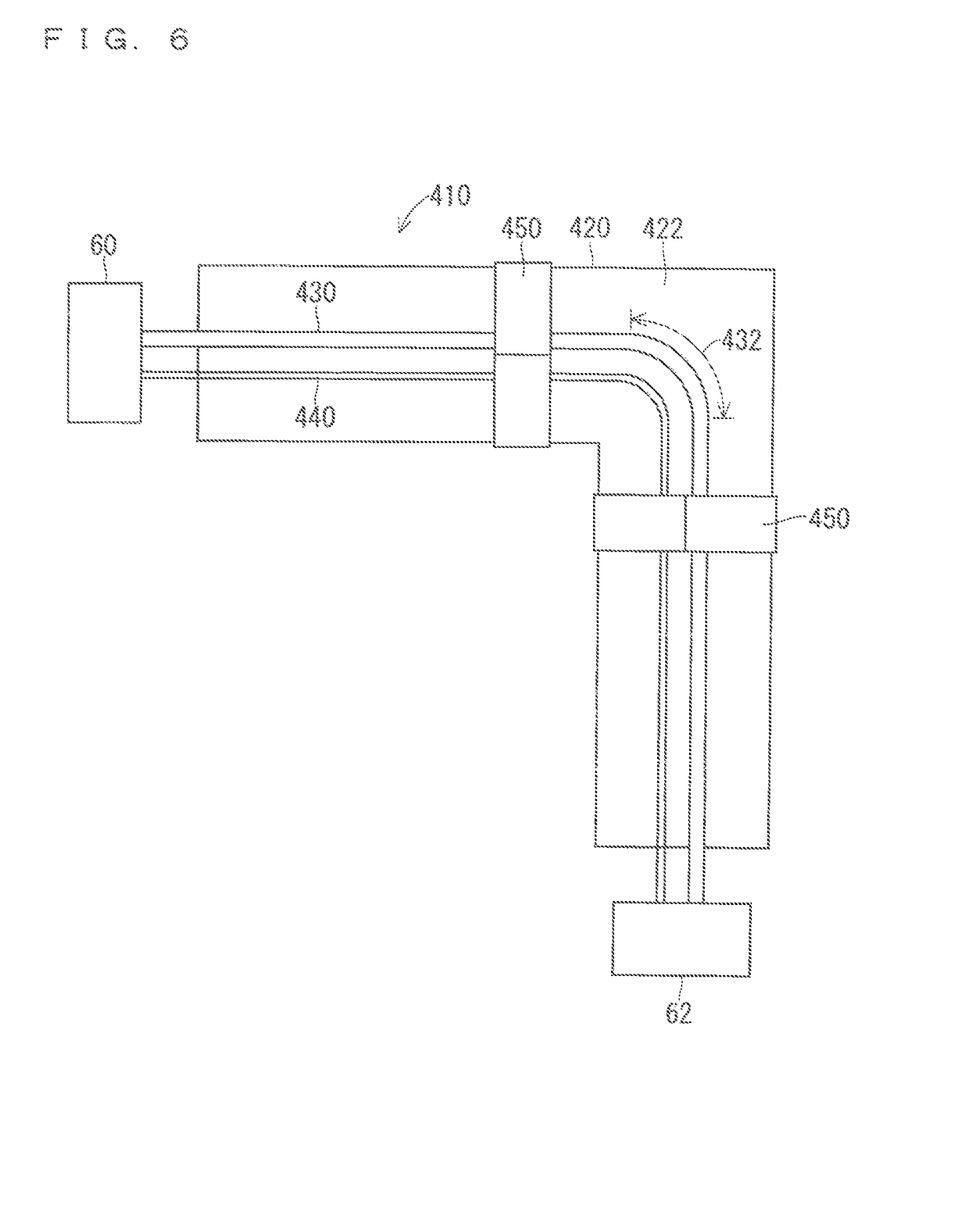
FIG. 6 is a plan view showing a wiring member according to a fourth modification.

FIG. 6 is a plan view showing a wiring member 410 according to a fourth modification. As shown in the figure, the wire-like transmission member 430 corresponding to the wire-like transmission member 30 may include a bending path portion 432 bent on the main surface 422 corresponding to the main surface 22. Here, the sheet member 420 is formed in an L-shaped bent shape.

The wire-like transmission member 430 is disposed on the main surface 422 along a path bent in an L shape similarly to the entire shape of the sheet member 420. Both end portions of the wire-like transmission member 430 linearly extend along both end side straight portions of the sheet member 420. The end portion of the wire-like transmission member 430 extends from the end portion of the sheet member 420 and is connected to the connectors 60 and 62. The intermediate portion in the extending direction of the wire-like transmission member 430 is bent at the bent portion of the sheet member 420. Here, the portion extending from the bending path portion 432 in the wire-like transmission member 430 is bent to form an angle of 90°. The bending path portion 432 may be bent so that a portion extending from the bending path portion 432 in the wire-like transmission member 430 forms an angle of more than 90° and less than 180°, or may be bent so that the portion forms an angle of less than 90°. The bending path portion 432 may be bent to form a corner or may be bent while being curved.

The fusion wire-like transmission member 440 corresponding to the fusion wire-like transmission member 40 is disposed along the wire-like transmission member 430. The number of the fusion wire-like transmission members 440 is optional. The fusion wire-like transmission member 440 may be omitted.

The at least one adhesive tape member 450 corresponding to the at least one adhesive tape member 50 presses the wire-like transmission member 430 toward the sheet member 420 at positions on both sides of the bending path portion 432.

Therefore, two portions extending outward from both sides of the bending path portion 432 in the wire-like transmission member 430 are separately held by the at least one adhesive tape member 450. Accordingly, the wire-like transmission member 430 along the bent path is easily held along a fixed path on the sheet member 420.

It should be noted that each of the configurations described in the above embodiment and respective modifications can be appropriately combined as long as they do not contradict each other.

EXPLANATION OF REFERENCE SIGNS

10: wiring member
20: sheet member
22: main surface
24: main surface
30: shielded cable (wire-like transmission member)
32: electric wire
33: core wire
34: covering
35: shield layer
36: sheath
40: (electric wire) fusion wire-like transmission member
41: core wire
43: covering
50: adhesive tape member
50*f*: adhesive surface
60: connector
62: connector
110: wiring member
150: adhesive tape member
152: side extending portion
154: extending end portion
210: wiring member
250: first adhesive tape member
256: second adhesive tape member
259*a*: overlapping portion
259*b*: overlapping portion
310: wiring member
342: fusion portion
370: auxiliary adhesive member
410: wiring member
420: sheet member
422: main surface
430: wire-like transmission member
432: bending path portion
440: fusion wire-like transmission member
450: adhesive tape member

The invention claimed is:

1. A wiring member comprising:
a wire-like transmission member;
a sheet member including a main surface on which the wire-like transmission member is disposed; and
at least one adhesive tape member whose one main surface is an adhesive surface,
wherein the at least one adhesive tape member surrounds the wire-like transmission member in a state where the adhesive surface faces toward the wire-like transmission member, and wherein the adhesive surface is in surface-to-surface contact with a portion of the main surface of the sheet member,
the at least one adhesive tape member extends outward from the wire-like transmission member and is adhered to the sheet member with interposition of the adhesive surface, and
the at least one adhesive tape member is wound with respect to the wire-like transmission member.

2. The wiring member according to claim 1, wherein the at least one adhesive tape member includes a side extending portion which extends toward an outside of the wire-like transmission member, and in which the adhesive surfaces are adhered to each other.

3. The wiring member according to claim 1, further comprising a fusion wire-like transmission member to be fused to the sheet member.

4. The wiring member according to claim 1, wherein the at least one adhesive tape member is provided at a position where a portion extending from the sheet member in the wire-like transmission member is configured to be held on the sheet member.

5. The wiring member according to claim 4, wherein the at least one adhesive tape member surrounds the wire-like transmission member at a position inside an end edge where the wire-like transmission member extends in the sheet member.

6. A wiring member comprising:
a wire-like transmission member;
a sheet member including a main surface on which the wire-like transmission member is disposed; and
at least one adhesive tape member whose one main surface is an adhesive surface,
wherein the at least one adhesive tape member surrounds the wire-like transmission member in a state where the adhesive surface faces toward the wire-like transmission member,
the at least one adhesive tape member extends outward from the wire-like transmission member and is adhered to the sheet member with interposition of the adhesive surface,
the at least one adhesive tape member includes a first adhesive tape member and a second adhesive tape member,
the wire-like transmission member is disposed between the first adhesive tape member and the second adhesive tape member,
an adhesive surface of the first adhesive tape member and an adhesive surface of the second adhesive tape member are adhered to each other on both outer sides of the wire-like transmission member, and
the first adhesive tape member protrudes from the second adhesive tape member and is adhered to the sheet member.

7. The wiring member according to claim 6, further comprising a fusion wire-like transmission member to be fused to the sheet member.

8. A wiring member comprising:
a wire-like transmission member;
a sheet member including a main surface on which the wire-like transmission member is disposed; and
at least one adhesive tape member whose one main surface is an adhesive surface, wherein the at least one adhesive tape member surrounds the wire-like transmission member in a state where the adhesive surface faces toward the wire-like transmission member, and wherein the adhesive surface is in surface-to-surface contact with a portion of the main surface of the sheet member, the at least one adhesive tape member extends outward from the wire-like transmission member and is adhered to the sheet member with interposition of the adhesive surface, and the at least one adhesive tape member extends outward from the wire-like transmission member and is wound around the sheet member.

9. The wiring member according to claim 8, further comprising a fusion wire-like transmission member to be fused to the sheet member.

10. A wiring member comprising:

a wire-like transmission member;

a sheet member including a main surface on which the wire-like transmission member is disposed; and at least one adhesive tape member whose one main surface is an adhesive surface, wherein the at least one adhesive tape member surrounds the wire-like transmission member in a state where the adhesive surface faces toward the wire-like transmission member, and the at least one adhesive tape member extends outward from the wire-like transmission member and is adhered to the sheet member with interposition of the adhesive surface, the wiring member further comprising a fusion wire-like transmission member to be fused to the sheet member, wherein the fusion wire-like transmission member is fused to the sheet member with interposition of a plurality of partial fusion portions, and the wiring member further comprises an auxiliary adhesive member to be adhered to the fusion wire-like transmission member and the sheet member so as to press a part between the plurality of fusion portions in the fusion wire-like transmission member.

* * * * *